United States Patent [19]

Exner

[11] Patent Number: 5,200,266
[45] Date of Patent: Apr. 6, 1993

[54] METHOD FOR PRODUCING CONSTRUCTION PANELS USING AIR HARDENING

[75] Inventor: Günter Exner, Dettelbach, Fed. Rep. of Germany

[73] Assignee: Fulgurit Baustoffe GmbH, Wunstorf, Fed. Rep. of Germany

[21] Appl. No.: 188,078

[22] Filed: Apr. 28, 1988

Related U.S. Application Data

[63] Continuation-in-part of Ser. No. 5,542, Jan. 21, 1987, abandoned.

[30] Foreign Application Priority Data

Jan. 22, 1986 [DE] Fed. Rep. of Germany ....... 3601734

[51] Int. Cl.$^5$ .............................................. B32B 13/02
[52] U.S. Cl. ..................................... 428/326; 428/331; 106/729
[58] Field of Search ................... 428/326, 331; 106/99

[56] References Cited

U.S. PATENT DOCUMENTS

| | | | |
|---|---|---|---|
| 2,084,354 | 6/1937 | Morbelli | 106/98 |
| 2,837,435 | 6/1958 | Miller et al. | 106/99 |
| 3,969,567 | 7/1976 | Occleshaw et al. | 428/331 X |
| 4,101,334 | 7/1978 | Hill et al. | 106/99 |
| 4,263,365 | 4/1981 | Burgess et al. | 106/99 X |
| 4,363,666 | 12/1982 | Johnson et al. | 106/99 X |
| 4,428,775 | 1/1984 | Johnson et al. | 106/99 X |
| 4,497,662 | 2/1985 | Chisholm et al. | 106/99 X |
| 4,565,840 | 1/1986 | Kobayashi et al. | 106/99 X |
| 4,582,755 | 4/1986 | Dietrich | 428/326 X |

OTHER PUBLICATIONS

*Handbook of Structural Concrete*, Ed: Kong et al., McGraw-Hill pp. 4-6 to 4-8, (1983).
*Concrete Technology*, vol. 1, Orchord, John Wiley & Sons p. 27, (1973).
Kirk–Othmer, "Encyclopedia of Chemical Technology" vol. 4, p. 691.
Kirk–Othmer, "Encyclopedia of Chemical Technology" vol. 21, p. 607–608.

*Primary Examiner*—Jenna L. Davis
*Attorney, Agent, or Firm*—Longacre & White

[57] ABSTRACT

A method for producing construction panels comprising cellulose fibers as the reinforcing means and of at least one inorganic binder such as cement and possibly of fillers, wherein the crude panels are subjected to air hardening by being stored in stacking structures so that in spite of the use of cement as the binder, cellulose fibers are used without being destroyed.

The invention provides that the sulfur trioxide content in the cement shall be less than 2%.

8 Claims, 1 Drawing Sheet

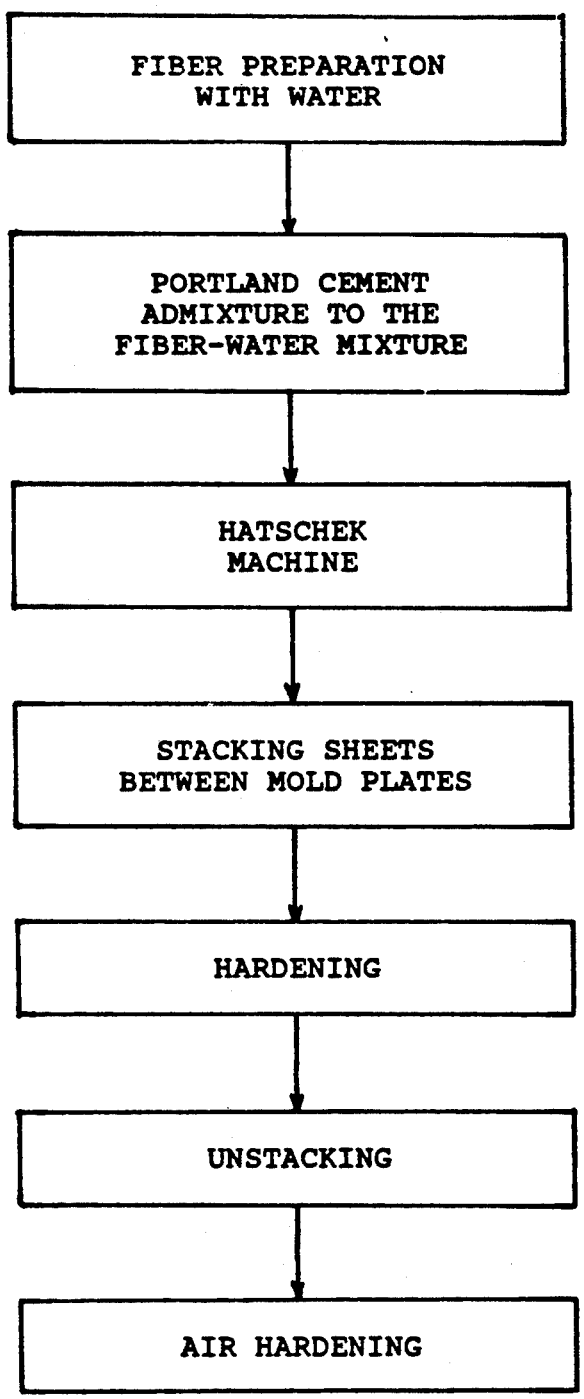

METHOD FOR PRODUCING CONSTRUCTION PANELS USING AIR HARDENING

This application is a continuation-in-part of application Ser. No. 07/005,542, filed Jan. 21, 1987 is now abandoned.

CROSS-REFERENCES TO RELATED APPLICATIONS

Applicant claims priority under 35 USC 119 for application P 36 01 734.5, filed Jan. 22, 1986, in West Germany.

The disclosure of copending application of Günter Exner entitled "A Method for Producing Construction Panels", filed Jan. 21, 1987 and having Ser. No. 07/005,541 now abandoned, is incorporated herein.

BACKGROUND OF THE INVENTION

The present invention concerns a method for producing construction panels consisting of reinforcing organic fibers, preferably cellulose fibers, and of at least one organic binder such as cement and possibly of fillers, wherein the crude panels are subjected to air hardening by being stored in stacking structures.

Of all the materials which are known and available for roofing and cladding, asbestos reinforced corrugated cement sheets and boards are among the best, since they possess good strength and their weathering characteristics give them a long life. A basic disadvantage of asbestos-cement sheets is the fact that they contain asbestos, a fibrous material the dust of which is thought to constitute a health hazard, and the industry is therefore constantly seeking alternatives to this materials.

No single material has been found with characteristics which satisfactorily match all those of asbestos, and it has thus been proposed to use mixtures of materials, e.g. mixtures of fibrous materials such as cellulose and glass fibers.

The state of the art of Asbestos-Cement Board and the chemistry of the portland cement bonding thereof may be ascertained by reference to the Kirk-Othmer ENCYCLOPEDIA OF CHEMICAL TECHNOLOGY, 2nd Edition (1970), Volume 21, pp 607 and 608.

The state of the art of non-asbestos cement panels may be ascertained by reference to U.S. Pat. Nos. 3,969,567; 4,101,335 and 4,428,275, and European Patent Specification 68,741 published Mar. 19, 1986, the disclosures of U.S. Pat. Nos. 3,969,567; 4,101,335 and 4,428,275 are incorporated herein by reference.

The Hatschek method used in the present invention is disclosed in the book ASBESTZEMENT by H. Klos, published by Springer-Verlag (1967), pp. 113-199, particularly p. 113.

The state of the art of air hardening by being stored in stacking structures may be ascertained by reference to Ullmann's ENCYCLOPEDIA OF TECHNICAL CHEMISTRY, Volume 4, (1953), pp. 232 and 233, and ASBESTZEMENT TECHNOLOGIE UND PROJEKTIERUNG, published by Springer-Verlag (1967), pp. 113, particularly 119.

When cement is used as the binder, there is a danger that over an extended period of time the calcium-sulfate/aluminum-hydrate (ettringite) is formed, which in the long run destroys the cellulose fibers.

For that reason attempts already have been made to replace the cellulose fibers with plastic fibers, illustratively polyvinyl alcohol (PVA) fibers or polyacrylonitrile (PAN) fibers. However, plastic fibers of this type are expensive compared to cellulose fibers and thereby the reinforced panels become uneconomical.

SUMMARY OF THE INVENTION

It is therefore the object of the invention to create a method of the initially cited kind making it possible to use cellulose fibers in spite of the presence of cement as the binder and to do so in such a manner that these cellulose fibers will have a service life of years without being destroyed.

To that end the invention provides that the sulfur trioxide proportion in the cement is up to about 2% by weight.

The object is realized because of the low sulfur trioxide proportion, whereby ettringite cannot be formed, or is formed only to an extent whereby the cellulose fibers are not destroyed.

Especially advantageously a sulfur trioxide proportion from about 0.1 to 1% is used.

Various possibilities are open to lower the sulfur trioxide proportion in the binder. One possibility is to use standard Portland cement and to mix it with pozzolanic substances such as ground blast-furnace slags, trass or the like, whereby the sulfur trioxide proportion referred to the binder mixture is lowered.

Another possibility is to increase the clinker dust proportion in the Portland cement with respect to the gypsum proportion, whereby the sulfur trioxide proportion in the Portland cement is also reduced.

BRIEF DESCRIPTION OF THE DRAWING

The FIGURE of the drawing is a flow sheet showing the steps of the process of the present invention.

DESCRIPTION OF THE PREFERRED EMBODIMENTS

With particular reference to the flow sheet it is shown that the cellulose fibers are first treated with water and then ordinary portland cement having a sulfur trioxide ($SO_3$) content up to about 2% is added to the fiber/water mixture. Suitably 5 to 20% by weight of fibers are mixed with 75 to 85% by weight portland cement.

After mixing the cement/fiber composition is passed through a Hatschek machine as disclosed in European Patent Disclosure 68,741, and the sheets produced therein are stacked between mold plates.

The sheets are hardened between the stacked plates and then unstacked.

After unstacking the panels from the mold plates they are air hardened as disclosed in "ASBESTZEMENT" and Ullmann's in stacking structures.

I claim:

1. In a method for producing construction panels comprising cellulose fibers as the reinforcing means and at least one inorganic binder, wherein the panels are subjected to air hardening by storage in stacking structures, the improvement comprising:
    said inorganic binder comprising Portland cement having a sulfur trioxide proportion between about 0.1% and 1% by weight of binder.

2. The method of claim 1, wherein said Portland cement is a standard Portland cement mixed with pozzolanic substances.

3. The method of claim 2, wherein said pozzolanic substances are selected from the group consisting of blast furnace slag and trass.

4. The method of claim 1, wherein 5 to 20% by weight of said cellulose fibers are mixed with 75 to 85% by weight of Portland cement.

5. The method of claim 3, wherein said Portland cement contains a proportion of clinker dust and gypsum and said proportion of said clinker dust is raised relative to said gypsum proportion.

6. In a construction panel comprising cellulose fibers as the reinforcing means and at least one inorganic binder, wherein the panel is subjected to air hardening by storage in stacking structures, the improvement comprising:
said inorganic binder comprising Portland cement having a sulfur trioxide proportion between about 0.1% and 1% by weight of binder.

7. The construction panel of claim 6, wherein 5 to 20% by weight of said cellulose fibers are mixed with 75 to 85% by weight of Portland cement.

8. A construction panel comprising:
a mixture of Portland cement and cellulose fibers,
wherein the mixture is characterized by comprising, in weight proportion, between 5%n and 20% of said cellulose fibers and between 75% and 85% of said Portland cement, and
wherein the sulfur trioxide weight proportion of said Portland cement is between about 0.1% and 1%.

* * * * *